E. COE.
Automatically Operated Gas-Cocks.

No. 155,498. Patented Sept. 29, 1874.

Witnesses.
J. H. Shumway
A. J. Tibbits

Edward Coe
Inventor
By Atty.
John E. Earle

UNITED STATES PATENT OFFICE.

EDWARD COE, OF NEW HAVEN, CONNECTICUT, ASSIGNOR TO HIMSELF AND HOMER W. FISKE, OF SAME PLACE.

IMPROVEMENT IN AUTOMATICALLY-OPERATED GAS-COCKS.

Specification forming part of Letters Patent No. 155,498, dated September 29, 1874; application filed May 19, 1874.

*To all whom it may concern:*

Be it known that I, EDWARD COE, of New Haven, in the county of New Haven and State of Connecticut, have invented a new Improvement in Automatic Device for Opening and Closing Stop-Cocks; and I do hereby declare the following, when taken in connection with the accompanying drawings and the letters of reference marked thereon, to be a full, clear, and exact description of the same, and which said drawings constitute part of this specification, and represent, in—

Figure 1:
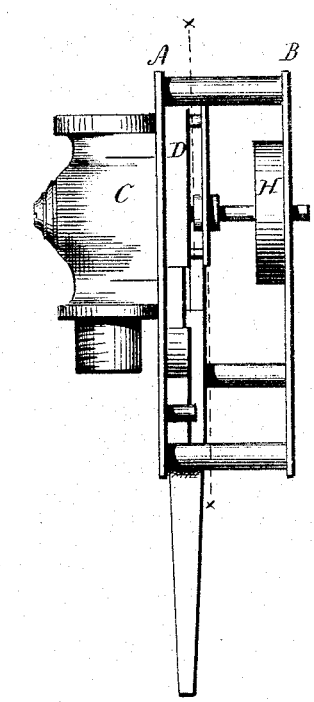
Figure 2:
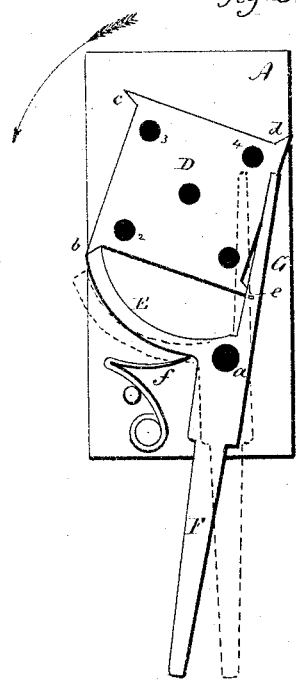

Figure 1 a side view, and in Fig. 2 a section on line $x$ $x$.

This invention relates to a device for automatically operating a cock to open or close the passage, designed with special reference to use on street-lamps, but applicable to other uses where the automatic opening and closing of the plug is desirable, and to be actuated by electricity, so that when the circuit is closed the plug will be turned to open the cock, and stand open until the circuit is again closed, when the same power will close the cock, and so continue to open and close at each alternate closing and opening of the circuit.

The invention consists in combining with the plug of a cock a ratchet, a spring to turn said ratchet, and a three-armed lever, one arm of which acts as a pawl for the teeth of the ratchet, the second arm upon the opposite side of the axis to stop the rotation of the ratchet before it has made its full movement, the third as a means for actuating the two.

A B are two plates, which form the frame for the mechanism. On one side is a cock, C, here represented as an ordinary gas-cock, to the plug of which a ratchet, D, is attached with any given number of teeth, preferably four, as shown, so that the wheel D, turning a single tooth, will turn the cock one-fourth around. In connection with the ratchet D is a pawl, E, hung at $a$, with an arm, F, extending down, as a convenient means for operating the pawl. Another arm, G, extends up over the surface of the wheel D, and on this surface are arranged studs 1 2 3 4 corresponding to the teeth $b$ $c$ $d$ $e$. A coil-spring, H, is arranged in connection with the ratchet, the tendency of the spring, when wound, being to turn the ratchet D toward the pawl E. The spring is wound in the usual manner of winding clocks. A light spring, $f$, tends to hold the pawl E against one of the teeth of the ratchet D.

For illustration of the operation: Suppose the parts to stand in the position seen in Fig. 2, and the passage in the cock closed. The arm F is thrown to the right, which will bring the arm G against the stud 1, the tooth $b$ having first escaped from the pawl E. The arm G will hold the ratchet and prevent its turning until the arm F be released; then the arm F will be forced back by the pressure of the stud 1 upon the arm G, and held by the spring $f$, the ratchet D turning until the tooth $c$ will strike the pawl and there be arrested. This will have turned the plug one-fourth around and opened the passage. A repetition of the operation will bring the arm G against the stud 2 until released; then the tooth $d$ will come against the pawl E, turning the plug another quarter and close the passage, and so continuing through the successive rotations, the alternate movements opening and closing the cocks.

If a magnet or electrical apparatus be used, it is arranged so that, when in connection, it will draw or force the arm F to the position in broken lines, Fig. 2, and there hold it until the connection be broken. By this arrangement all the cocks on a single circuit may be opened at the same time.

Other devices than electricity may be employed to actuate the arm F. I therefore do not confine myself to any particular power for operating the device.

It will be understood that the spring must be wound so soon as its power has ceased to properly rotate the ratchet and plug.

I claim as my invention—

The combination of the ratchet D, in connection with the plug of a cock, and provided with studs 1 2, &c., corresponding to the teeth of the ratchet, the spring H, and the three-armed lever, E F G, substantially as specified.

EDWARD COE.

Witnesses:
A. J. TIBBITS,
J. H. SHUMWAY.